Figure 1:
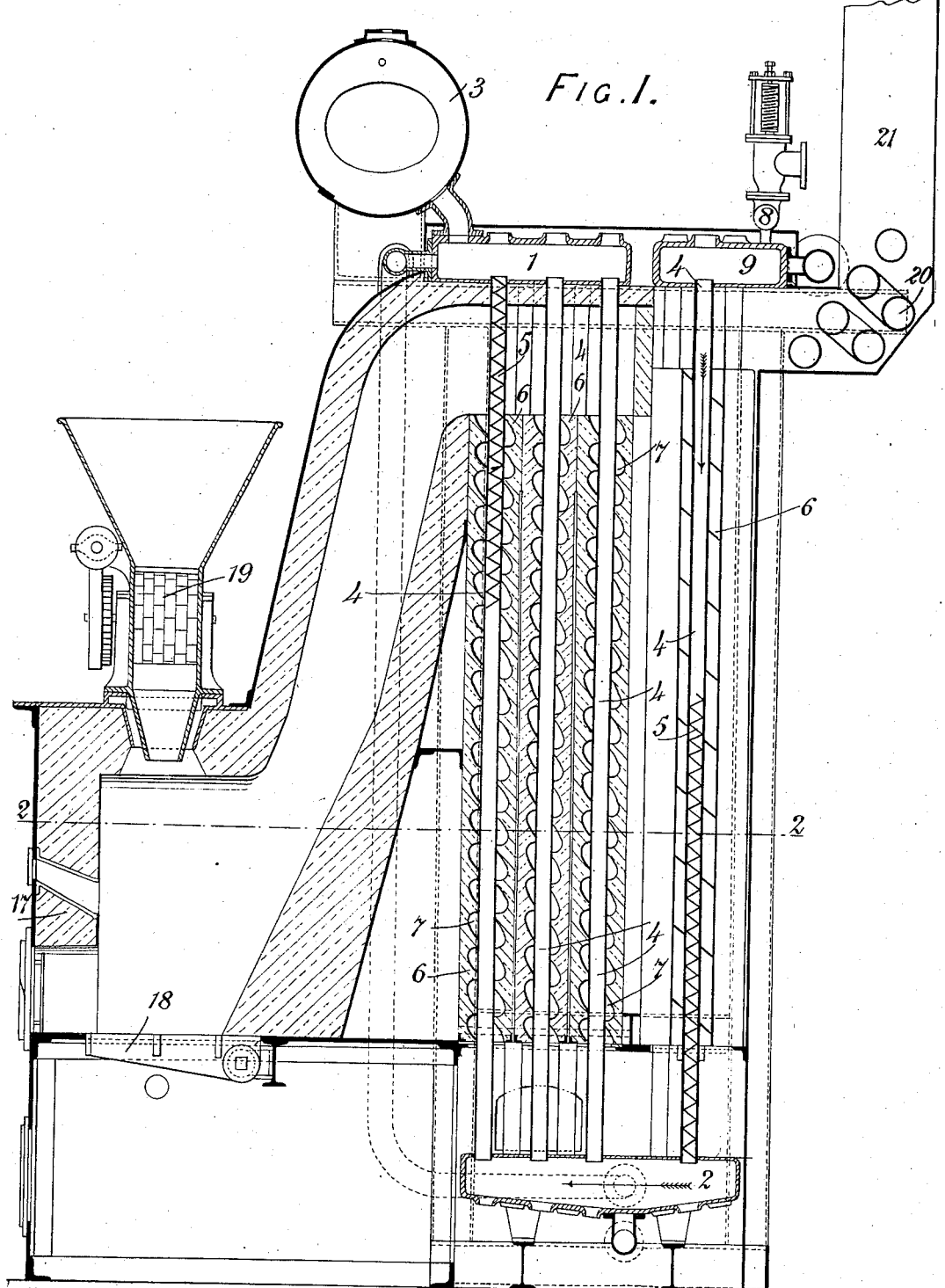

No. 754,348. PATENTED MAR. 8, 1904.
F. J. ROWAN.
STEAM BOILER.
APPLICATION FILED DEC. 19, 1903.
NO MODEL. 5 SHEETS—SHEET 1.

WITNESSES: INVENTOR
Frederick John Rowan
BY Howson and Howson
HIS ATTORNEYS.

No. 754,348. PATENTED MAR. 8, 1904.
F. J. ROWAN.
STEAM BOILER.
APPLICATION FILED DEC. 19, 1903.
NO MODEL. 5 SHEETS—SHEET 2.
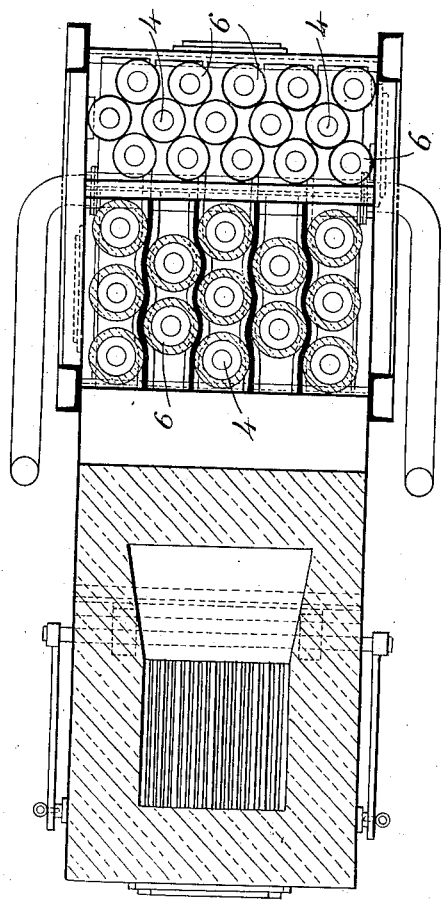
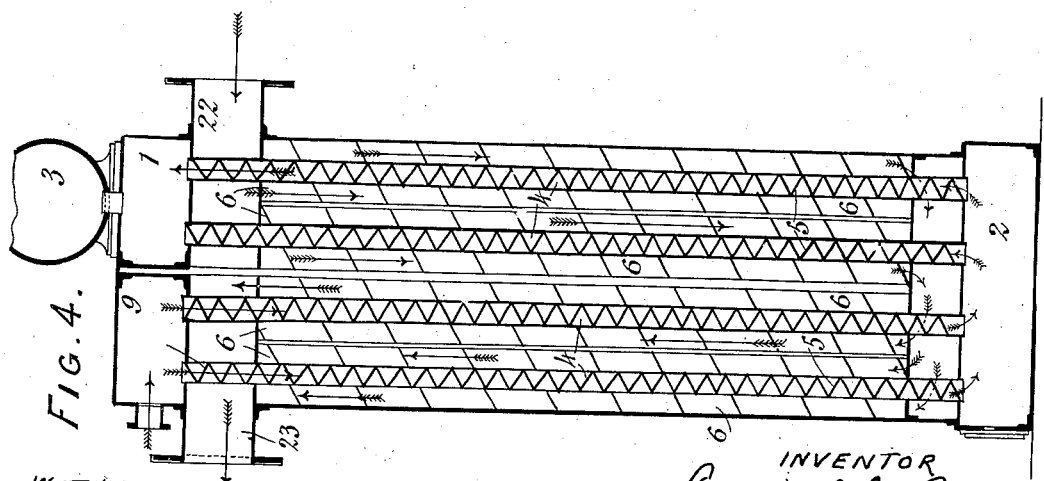
WITNESSES:
F. W. Wright.
Walter Abt.
INVENTOR
Frederick John Rowan
BY
Howson and Howson
HIS ATTORNEYS.

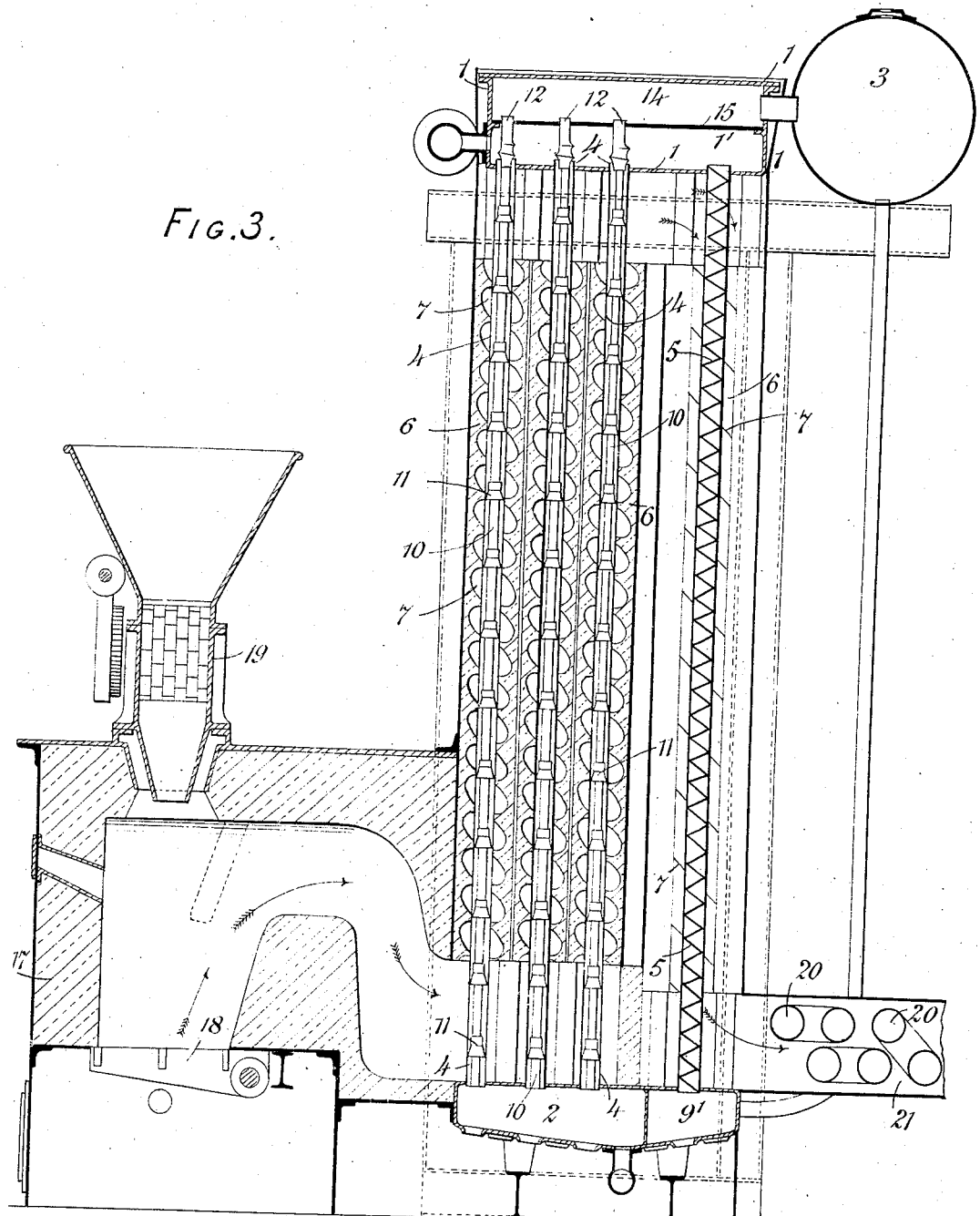

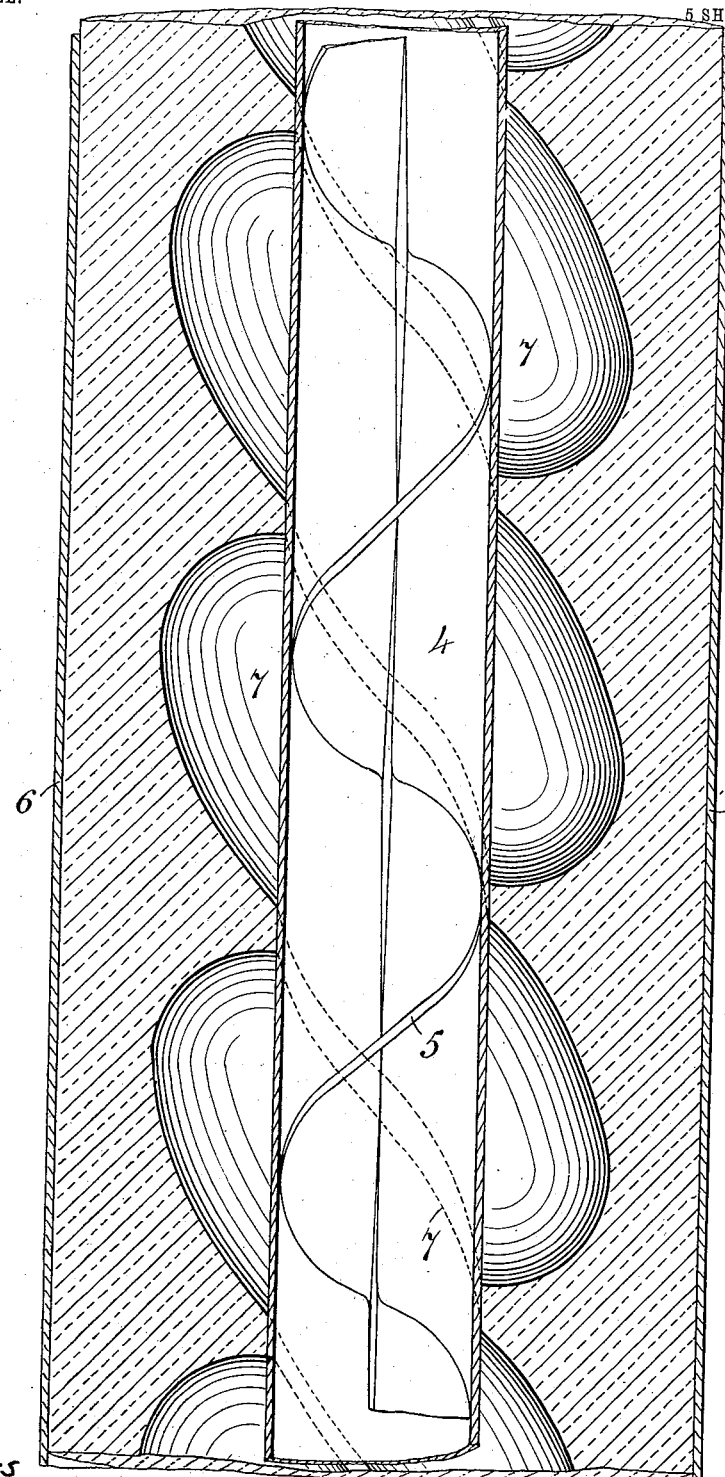

No. 754,348. PATENTED MAR. 8, 1904.
F. J. ROWAN.
STEAM BOILER.
APPLICATION FILED DEC. 19, 1903.
NO MODEL. 5 SHEETS—SHEET 5.
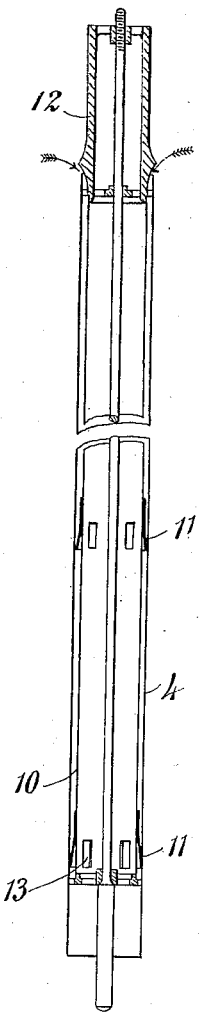
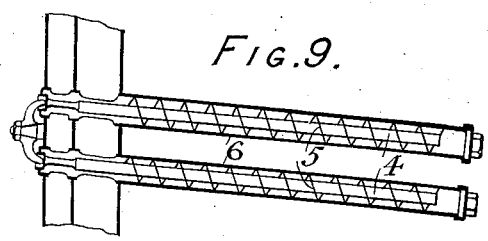
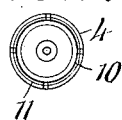
WITNESSES:
F. W. Wright
Walter Abbr
INVENTOR
Frederick John Rowan
BY
Howson and Howson
HIS ATTORNEYS No. 754,348.                                         Patented March 8, 1904.

UNITED STATES PATENT OFFICE.

FREDERICK JNO. ROWAN, OF GLASGOW, SCOTLAND.

STEAM-BOILER.

SPECIFICATION forming part of Letters Patent No. 754,348, dated March 8, 1904.

Application filed December 19, 1903. Serial No. 185,846. (No model.)

*To all whom it may concern:*

Be it known that I, FREDERICK JOHN ROWAN, engineer, a subject of the King of Great Britain and Ireland, and a resident of Glasgow, Scotland, have invented certain new and useful Improvements in Steam-Boilers, (for which an application for a patent has been filed in Great Britain, No. 3,328, bearing date the 12th of February, 1903,) of which the following is a specification.

My invention has for its object the rendering of the heating-surface of boilers and feed-heaters more efficient as regards the transmission of heat.

It is well known that the amount of heat hitherto transmitted from the fuel to the water in boilers per unit of their heating-surface bears only an extremely small proportion to that which that surface is capable of transmitting. It is also known that results obtained in evaporators show from fourteen to fifty times the rates of evaporation per unit obtained in boilers, so that the room for improvement in the latter is manifest. Experiments on heat transmission have also shown that an evaporation of from fifty to eighty pounds of water per square foot of surface per hour is possible in boilers without undue heating of the metal, and on this account I have devised improvements with a view to obtaining at any rate a portion of that increased rate of evaporation in boilers.

In carrying my improvements into practice I use means to divide both the water and the hot gases into a number of more or less minute streams somewhat after the fashion of the "film" system used in multiple-effect evaporators. I also employ means to increase the length of travel of both water and gases over the heating-surface, thus prolonging their time of contact with the surface while being able to increase their velocity of movement over it without increasing the total amount of surface in a given boiler. I also make use as far as possible of the "counter-current" system in directing the course of movement of water and hot gases, and preferably employ means for carrying on the combustion of the fuel under a considerable increase of atmospheric pressure. My improvements may, however, be combined with ordinary grate-combustion with either forced or natural draft, although that system is the cause of a great loss of heat.

My improvements are applicable to water-tube boilers with either vertical, vertically-inclined, horizontal, or horizontally-inclined tubes or with hanging tubes of the "Perkins" or "Field" pattern with concentric inner tube.

In order that my said invention and the manner of carrying same into practice may be properly understood, I have hereunto appended five sheets of explanatory drawings, in which—

Figure 1 is a sectional elevation of a combined steam-boiler and feed-water heater as constructed in accordance with my improvements, and Fig. 2 is a horizontal section as taken on the line 2 2 of Fig. 1. Fig. 3 is a view corresponding to Fig. 1, but showing the hot gases or products of combustion and the feed-water flowing or passing in the opposite direction to that shown in Fig. 1, and showing the boiler-tubes as fitted with current-directing shields. Fig. 4 is a sectional elevation of a steam-generator, which may be used in connection with gas-engines. Fig. 5 is a detached sectional elevation of one of the tubes shown in Fig. 1 as fitted with liquid-directing spiral inside and spiral passage for the heating-gases outside. Fig. 6 is a similar view illustrating the shield or film form of liquid circulation; and Fig. 7 is a horizontal section of same, while Fig. 8 is a modified form of film-directing spiral; and Fig. 9 is a sectional view of the Niclausse type of tubes fitted with ribbon spirals.

Referring to Figs. 1 and 2 of the drawings, I construct, for example, a boiler of vertical water-tubes connected at top and bottom ends to headers or boxes 1 and 2, respectively, of rectangular or other section coupled together in such a way as to insure a free and equal supply of feed-water to all the tubes below and free access at the top for the escape of the steam to the steam drum or collector 3. Inside of each of these water-tubes 4 is placed a spiral, such as a ribbon spiral 5, of thin sheet-steel or any other suitable metal, and each tube 4, or it may be a group of tubes, is surrounded by a larger tube 6, which may be lined with fire-brick or other refractory substance, forming a spiral flue or passage 7 for the hot gases round the tube or tubes 4 in the direction opposite to that taken by the water in the internal spiral 5. The spiral may be formed of fire-brick of hexagonal or other shape in plan and the outer tube 6 may be dispensed with. In some cases the outer annular tube 6 may form the water-circulating space and the heating-gases pass through the inner tube 4, in which case the outer tubes would be made of metal and be fitted with metal-spirals and the connections be arranged accordingly. I prefer, as shown in Fig. 1, to cause the water to ascend in the boiler-tubes 4, while the flame and hot gases descend through the annular tubes 6. In this way the hottest water meets the hottest gases at the top of the tubes and steam is produced in such a way as to insure that the minimum of water is carried up by it into the steam-space 3. In the case of this design a feed-heater of similar construction is placed at the back of the boiler, as shown in Fig. 1, or in any convenient position, so that the waste gases from the boiler may pass through the flue-spirals in it, while the feed-water from the pipe 8 passes into the header 9 of feed-heater, and is caused to flow in the opposite direction, passing down through the tubes 4 in heater to the header 2 at bottom and then up through the tubes 4 of boiler to the upper header 1.

Instead of the ribbon spiral in the interior of the water-tube 4 I can, as shown in Fig. 3 and in detail in Figs. 6 and 7, make use of an internal tube 10 of smaller diameter, having rings or pieces 11 projecting from it to the water-tube at an angle downward, so as to direct the water in a thin stream or film over the inner surface of the water-tube 4. A conical nozzle or distributer 12, Fig. 6, at the inflow end first spreads the water over the tube-surface, and the inner tube 10 with projections 11 continues the process. Underneath the projections are openings 13 for the steam to escape into the inner tube 10, which is prolonged by the nozzle 12 into the steam-space 14 of the header 1. The top headers 1 in this case are separated into two compartments by a diaphragm 15, fixed or movable, the water being continuously fed into the lower compartment while the steam escapes into the higher compartment 14. The water-tubes 4 are surrounded by spiral-shaped flues or passages 7, as in the former design shown in Figs. 1 and 2, but the course of the gases around the boiler-tubes 4 will be upward as the water flows downward. The feed-water heater may be arranged on a similar plan. The water is pumped into the lower header 9', Fig. 3, and is forced by the pressure from a circulating-pump up the tubes 4, fitted with spirals 5 in the feed-heater, and after passing into the lower chamber of top header 1 flows down the boiler-tubes 4 to the bottom header 2, from whence it passes to the circulating-pump. Instead of having an inner tube 10, Fig. 6, within the tubes 4 extending the whole length of outer tube same may be fitted, as in Fig. 8, with a top part 12 extending down from steam-space compartment 14 of header 1 and have an outer surface of volute or spiral indentations 16 formed on the part 12 at or below where the water enters the tubes 4, so as to give a spiral or spinning action to the column of water passing down the tube 4, while the steam generated will pass up through the center of this water column and escape by the hollow top 12 into the steam-space 14 of header 1. These arrangements are applicable to water-tubes placed horizontally or otherwise without serious mechanical difficulty. In such a case the water would not fall by gravity and would be caused to flow in the boiler by an ordinary circulating-pump in order to give it sufficient velocity for successful heat transmission. I may, however, also use the circulating-pump with vertical tube-boilers to increase the speed of water circulation.

In the case of Perkins or Field tubes with concentric inner tube, as shown in Fig. 9, I cause the water to be forced in by the inner tube 4, and by placing a ribbon spiral 5 in the space between it and the outer tube 6 I cause the water to get an improved circulation, and the inner tube 4 will also be maintained in position centrally.

I use preferably an external firing-chamber 17 with small grate 18 and considerable depth of fuel, air under pressure being delivered both below the grate and over the surface of the fire. The coal can be fed automatically and any desired pressure maintained in the firing-chamber and boiler-flues by having an air-lock for the coal-hopper 19 and making the boiler-casings pressure-proof. The ordinary inside grate does not readily lend itself to high-pressure combustion. I combine air-heaters for extracting waste heat from the hot gases and transferring it to the air wanted for combustion and my arrangement of boiler and feed heater enables me to have only the air-heater in the form of tubes 20 in the uptake 21 leading to the chimney.

The same construction of feed-heaters may be employed where steam instead of waste furnace-gases is used as the heating medium. In this case the steam may be passed in either direction in either the outer or the inner tube, the water being in the remaining one.

In the arrangement shown in Fig. 4 the apparatus comprises a steam generator which would be very suitable for use in connection with gas-producing and utilizing plant, so that the exhaust-gases from the gas-engines can be utilized to generate steam for injecting into the gas-producers. In this arrangement the water is fed to the heater 9, from whence it passes down the tubes 4, fitted with spirals 5, to the bottom header 2 and then ascends through the tubes 4 to the top header 1 and the generated steam passes to the drum 3, while the exhaust-gases from the gas-engines would pass in the opposite direction from the inlet branch 22 downward through the one set of outer spiral tubes 6 and then upward the other set to the outlet 23 and so heat the central water-tubes 4 and generate the steam.

Having now described my invention, what I claim as new, and desire to secure by Letters Patent, is—

1. In steam-boilers and in feed-heaters the combination comprising water-tubes, means within the water-tubes for dividing the flowing water into minute streams, outer tubes fitted with spirals and top and bottom headers, whereby the heated and heating fluids are divided into minute streams flowing in opposite directions and the extent of travel of these fluids is increased, substantially as herein described.

2. In steam-boilers and in feed-heaters water-tubes, means within the water-tubes for dividing the flowing water into minute streams in combination with an outer equivalently formed or fitted tube or passage through which the heating gases or steam pass in the opposite direction substantially as herein described.

3. In combination a steam-boiler, a feed-heater, water-tubes, means within the water-tubes for dividing the flowing water into minute streams and an outer equivalently formed or fitted tube or passage through which the heating gases or steam pass in the opposite direction substantially as herein described.

4. In steam-boilers and in feed-heaters, the combination comprising water-tubes fitted with film-tubes, heating-tubes fitted with spirals, and top and bottom headers, the top header being fitted with a horizontal dividing-plate, and film-tubes carried above said plate, substantially as herein described.

In testimony whereof I have signed my name to this specification in the presence of two subscribing witnesses.

FRED. JNO. ROWAN.

Witnesses:
   JOHN SIME,
   R. C. HOWSON.